Oct. 1, 1957  R. S. MILLER ET AL  2,808,324
SMELTING METHOD OF ILMENITE
Filed Feb. 6, 1956
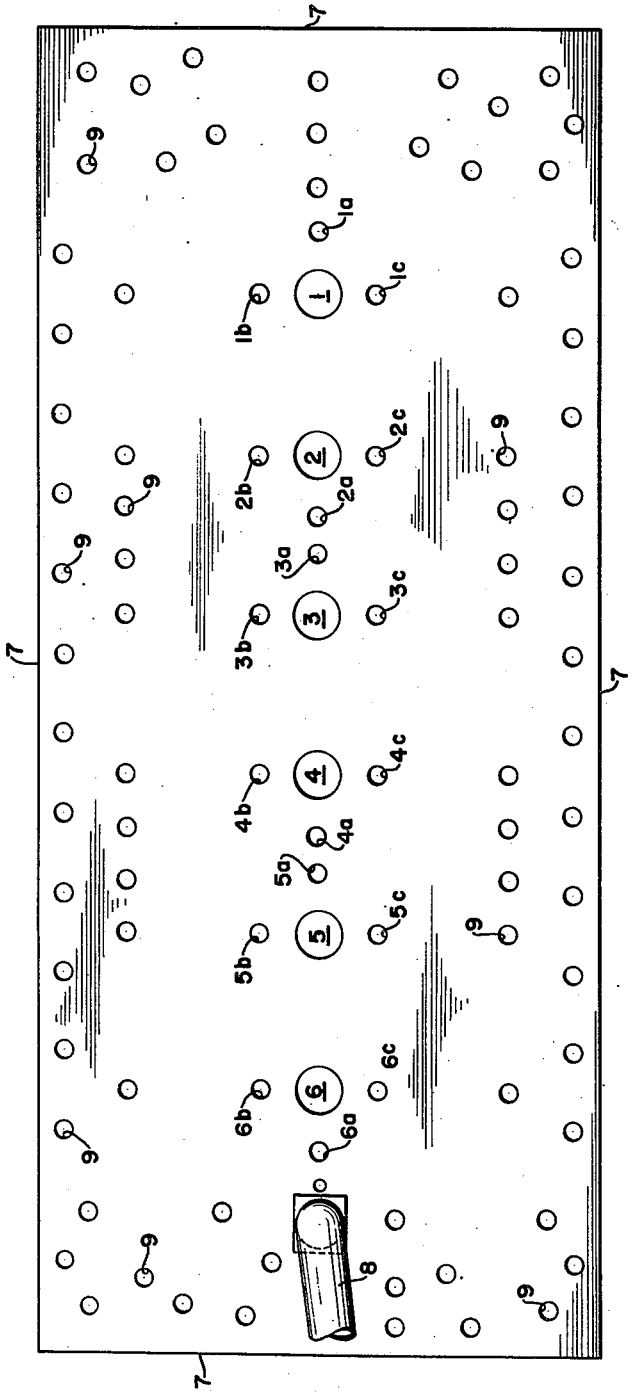
INVENTORS
RALPH S. MILLER
GERALD G. HATCH
BY
ATTORNEYS

United States Patent Office 2,808,324
Patented Oct. 1, 1957

2,808,324

METHOD OF SMELTING ILMENITE

Ralph S. Miller and Gerald G. Hatch, Sorel, Quebec, Canada, assignors to Quebec Iron and Titanium Corporation, Wilmington, Del., a corporation of Delaware Application February 6, 1956, Serial No. 563,775

4 Claims. (Cl. 75—10)

This invention relates to the smelting of ilmenite and, more particularly, to a method of charging a mixture of titaniferous ore and solid carbonaceous material to an electric arc furnace wherein the charge is smelted to produce a titanium slag concentrate and a molten iron product.

In the United States patent to Peirce et al. No. 2,476,453 there is described the production of a molten titanium slag concentrate and a molten metallic iron product by the smelting of a charge composed predominantly of ilmenite and solid carbonaceous reducing material. Although the smelting method and charge correlation described in the patent represents the most modern development in the smelting of ilmenite, the practice of this method in an electric arc furnace presented a formidable challenge when the scale of the smelting operation was greatly enlarged.

One of the problems encountered in smelting ilmenite with a solid carbonaceous reductant is the protection of the furnace against the destructive nature of the requisite high smelting temperature. For example, in the smelting of ilmenite pursuant to the aforementioned Peirce et al. patent, the smelting operation requires enough heat to produce the molten titanium slag concentrate at a tapping temperature within the range of 1500° to 1700° C. When this smelting was carried out in such a manner as to favor protection of the furnace roof, and this was done by submerging the furnace arcs in the charge, the heat generated by the arcs was directed downwardly and caused the lining in the bottom of the furnace to melt. It was also found that fusion and sintering of the charge above the submerged arcs formed a relatively impervious container for the carbon monoxide gas produced in the smelting zone, with the result that the gas pressure generated in the smelting zone intermittently forced the charge upwardly against the furnace roof with explosive violence. Consequently, it was determined that submerged arc melting was not practical and that the best furnace practice consisted of side wall feeding wherein the fresh charge was delivered onto the surface of a protective sloping bank of the charge material adjacent the furnace walls.

Although this side wall charging method was effective in a furnace operated at 1000 kw., an increase in scale to 15,000 kw. and over created additional problems. In the smelting of ilmenite on this larger scale it was found that the charge material delivered to the protective sloping banks would not flow smoothly into the smelting zone regardless of attempts to promote this flow by adjustment of the particle size of the charge material; the side wall banks would build up to a mechanically unstable condition and would then suddenly collapse into the active smelting zone. This sudden entry of relatively cool solid charge into the molten slag layer in the smelting zone had a disastrous effect; some of this solid charge was promptly smelted with liberation of a corresponding amount of carbon monoxide, and the heat absorbed by this smelting reaction and by the relatively cool solid charge itself chilled the molten slag to the point where it became viscous. This evolution of gas within the viscous slag produced a slag foam in such large quantities that it rose quickly within the furnace. As the foam level rose, the automatically controlled electrodes were also raised, with the result that the electrode arcs were brought up progressively closer to the furnace roof. Moreover, the rising slag foam ultimately reached the furnace roof where, because of its mechanical movement and high temperature, it caused serious corrosion of the roof structure.

As a result of a very extensive study of the behavior of electric arc smelting of ilmenite under a variety of charging conditions, we have discovered that a specific procedure combining both side charging and center charging makes possible smooth furnace operating conditions and therefore efficient smelting conditions when using three-phase current with a minimum of three, and generally with a multiple of three, furnace electrodes. That is, we have discovered that, after the protective side wall banks of the charge have been established, the charge subsequently fed to maintain the smelting operation should be so distributed that only that amount, up to about 20% of the charge, which is required to maintain the side wall charge configuration is delivered to these side banks and the remainder is delivered to the central portion of the furnace in a particular relation to the electrodes. The charge can thus be maintained in the furnace in such an aspect that it feeds uniformly and smoothly into the active smelting zone while at the same time offering effective shielding of the furnace side walls and roof without driving the smelting heat excessively into the bottom of the furnace.

The method of charging a mixture of titaniferous ore and solid carbonaceous material to a three-phase electric arc furnace pursuant to our invention thus comprises first delivering the charge to the furnace in such manner as to establish a sloping bank of the charge adjacent each side wall of the furnace with the lower extremities of the sloping banks terminating outboard of the electrodes, that is, terminating short of the electrodes. Thereafter, the smelting aspect of the charge is maintained during continuous smelting by delivering between 80% and 100% of the charge to the central portion of the furnace in the vicinity of the electrodes and the remainder to the peripheral portion of the furnace whenever it is required to maintain the aforementioned sloping side wall banks. The charge delivered into the central portion of the furnace is so distributed that from 50 to 80% thereof is introduced in aliquot portions into the spaces between adjacent electrodes of different phase connection and the balance thereof is introduced in aliquot portions laterally of each of the electrodes. The smelting aspect of the charge maintained by this procedure is a sloping side bank configuration the lower extremities of which terminate outboard of the electrodes but are interconnected along their longitudinal portions by bridges of the charge extending therebetween across the portions of the active smelting zone in which the heating arcs are concentrated. The side banks of charge thus protect the furnace side walls, and the bridges not only support the lower extremities of these banks, so as to prevent their collapse into the active smelting zone, but also shield the furnace roof from the hottest portion of the heating arcs.

These and other novel features of the furnace charging method of our invention will be more fully understood by reference to the accompanying drawing in which the single figure is a simplified plan view of the top of an electric arc furnace showing the relative positions of the furnace electrodes and of the charge ports.

As shown in the drawing, the side walls 7 define an oblong furnace structure which is several times long as it is wide. The furnace is provided with six electrodes, numbered 1 through 6 in the drawing, arranged at equally spaced intervals along the longitudinal center line of the furnace. The electrodes extend downwardly through the furnace roof to a position slightly above the level of the molten smelting products in the bottom of the furnace. The top of the furnace is provided with the gas outlet 8 through which the gaseous products of the smelting operation (principally carbon monoxide and nitrogen) are withdrawn.

The roof of the furnace is further provided with a number of charging ports. As can be clearly seen in the drawing, these charging ports are arranged in two distinct patterns. The charging ports 9 arranged around the peripheral portion of the furnace are positioned in such a pattern that the charge delivered to the furnace through these ports is capable of establishing and maintaining sloping side wall banks of the charge within the interior of the furnace. The second pattern of ports is made up of those positioned relatively close to the electrodes. This second pattern of charge ports is arranged so as to deliver the smelting charge close to the electrodes. The distribution of charge between the outer pattern and inner pattern of charge ports, together with the position of the individual members of the inner pattern charge ports and the distribution of charge therethrough, are responsible for the specific charge aspect which is obtained by the practice of our invention.

The charge introduced into the furnace, composed primarily or even exclusively of a mixture of ilmenite and coal, is first smelted in the furnace during the starting-up operations so as to form a molten body of metallic iron with a supernatant body of molten titanium slag concentrate. A large excess of charge is introduced into the furnace so as to provide a layer of unsmelted charge which forms protective side banks sloping upwardly and outwardly adjacent the furnace side walls so as to protect these walls against the high smelting temperatures. The starting-up operation and the charging technique during this operation form no part of our present invention except insofar as they result in the formation of sloping side wall banks of the charge mixture the lower extremities of which, at the molten slag surface, terminate outboard of the electrodes 1 through 6. When this condition has been established, the charging method of our invention is then invoked.

In practicing our novel charging method, the charge is distributed between the outer pattern of charge ports 9 and the inner pattern of charge ports near the electrodes in such manner that, except for an amount up to about 20% required to maintain the sloping side banks and introduced into the furnace through the outer pattern of charge ports 9, the charge is introduced through the inner pattern of charge ports close to the electrodes. The portion of the charge introduced through the outer pattern of charge ports 9 is so distributed through the various members of this group of ports as to maintain the aforementioned sloping side wall banks the faces of which are slowly consumed by smelting. Consequently, over a period of several days a definite amount of the charge (generally about 5 to 20%) is delivered through the outer charge ports 9, even though over a period of many hours (and even for a day) there may be no charge introduced through these ports. The remainder of the charge delivered through the inner pattern of charge ports is distributed in a specific manner which will establish and maintain a charge aspect within the furnace characterized not only by the aforementioned sloping side banks but also by bridges of the charge extending between the longitudinal portions of the lower extremities of the sloping side banks and across the portions of the active smelting zone in which the heating arcs are concentrated.

It is well-established that the heating arcs in multi-phase furnace operation are concentrated in a line close to an imaginary line joining the adjacent electrodes of different phase connection. When three-phase arc heating is used on a very large scale, the tremendous current required to meet the smelting needs necessitates the use of two electrodes to share the current-carrying burden for each of the three phases. In such an arrangement, which is shown in the drawing, the electrodes are connected so that each successive pair along the center line of the furnace is connected to a different phase. Thus, electrodes 1 and 2 are connected to one phase, electrodes 3 and 4 are connected to a second phase and electrodes 5 and 6 are connected to the third phase. In consequence, arc formation is more concentrated, for example, between electrodes 2 and 3 than between electrodes 1 and 2. For the same reason, the heating arcs from electrodes 4 and 5 to the bath are primarily concentrated along the same center line between these two electrodes. Electrodes 1 and 6 are also of different phase connection, although they are physically separated a substantial distance from one another. The arcs from these two electrodes are nevertheless concentrated along the longitudinal center line of the furnace in much the same manner as if these two electrodes were in the same relative position as any of the other two adjacent electrodes of different phase connection. Accordingly, where reference is made herein and in the claims to "adjacent electrodes of different phase connection" it is to be understood that this term includes not only electrodes 2 and 3 and electrodes 4 and 5 but also electrodes 1 and 6.

As can be seen in the drawing, the furnace is provided with charging ports positioned directly above the space between each of the adjacent electrodes of different phase connection, to wit, the ports 1a, 2a, 3a, 4a, 5a and 6a. The end ports 1a and 6a are positioned above the space between electrodes 1 and 6, the ports 2a and 3a are positioned above the space between electrodes 2 and 3 and the ports 4a and 5a are positioned above the space between the electrodes 4 and 5. The charge introduced into these ports 1a through 6a is therefore delivered directly into the space between each of the adjacent electrodes of different phase connection.

In addition to charge ports positioned directly above the space between each of the adjacent electrodes of different phase connection, the inner pattern of charging ports includes ports positioned laterally of each of the electrodes. That is, on each side of each electrode there is positioned a charge port, identified as the ports 1b through 6b and 1c through 6c, each of which is substantially the same distance from the surface of the proximate electrode as the spacing between the charging ports 1a through 6a and their respective proximate electrode surfaces. With the resulting pattern of charging ports in the vicinity of the electrodes (ports 1a—6a, 1b—6b and 1c—6c), the portion of the charge delivered to the furnace through the ports of this pattern is so distributed that about 50% to 80% of it is introduced in aliquot portions into the spaces between the adjacent electrodes of different phase connection and the balance of it is introduced in aliquot portions laterally of each of the electrodes. Thus, when 50% of the central charge portion is introduced into the spaces between adjacent electrodes of different phase connection, one-sixth of this central charge portion is introduced through the ports 2a and 3a collectively, another sixth is introduced through the ports 4a and 5a collectively, a third sixth is introduced through the ports 1a and 6a collectively, and the remaining three-sixths (the remaining 50%) of the central charge portion is introduced in aliquot portions through the lateral ports 1b through 6b and 1c through 6c. This charge pattern in the vicinity of the electrodes, coupled with the overall charge pattern controlling distribution of the charge between the peripheral and central portions of the furnace, is responsible for the specific charge aspect within the furnace.

The furnace charge aspect, pursuant to our invention, is characterized by sloping side banks of the charge terminating short of the electrodes and transverse bridges of the charge extending between the terminal portions of the side banks and across the spaces between each of the electrodes. The bridges are sintered by the arc heat so that they have sufficient compressive strength laterally of the furnace (longitudinally of each bridge) to support the lower extremities of the side banks. The bridges thus resist the tendency for the side banks to collapse and in this way they substantially eliminate the cause of slag foaming and its resulting attack on the furnace roof. Moreover, the bridges also form a relatively thin and gas-pervious shield over the active smelting zone below the electrodes, and in this way the bridges further protect the furnace roof against the ravages of the intense heat of the smelting zone.

We have also found that the bridges of charge formed over the space between adjacent electrodes affords a sensitive and accurate guide to smelting conditions. The interior of the furnace above the charge level is, of course, so filled with dust and fumes that it is impossible to obtain a direct view of the charge aspect. However, it is possible to ascertain the level of the surface of all portions of the charge by probes lowered into the furnace through appropriately positioned openings in the furnace roof. The probes not only indicate the level and slope of the side banks but also the level of the bridges therebetween. Inasmuch as the bridges are formed and maintained directly above the active smelting zone (that is, the zone between the lower ends of the electrodes and the surface of the slag layer), the bridges are constantly being consumed as the principal source of charge to the smelting zone. The spaces between adjacent electrodes of similar phase connection are supplied by the lateral ports 1b—6b and 1c—6c, and the spaces between adjacent electrodes of different phase connection are supplied by the centerline ports 1a—6a. Although the smelting heat resulting from the arc concentration produces more rapid smelting in the area between electrodes of different phase connection than in the area between electrodes of similar phase connection, the charge pattern of our invention compensates for this difference so as to supply charge to each area in proportion to the prevailing smelting rate. For this reason the level of the bridges, measured as a certain distance below the furnace roof, will remain substantially constant in the absence of a change in the charge rate or in the smelting rate. When the charge is accurately weighed and is delivered pursuant to the charge pattern of our invention at a rate equal to the heat input to the furnace as measured by the power input to each electrode, any significant variation in the bridge level will be due to a variation in the smeltability of the charge composition of the bridges.

Such variations in the bridge level actually occur, not only as a result of changes in amount of charge and as a result of intentional changes in the charge composition to compensate for an undesirable variation in the slag composition, but also because of unintentional changes in the charge composition due for example to segregation of the charge constituents in the feed bins or to changes in charge constituents. A lowering of the bridge level is indicative of a carbon deficiency which produces a slag of relatively higher iron oxide content and therefore less demanding of smelting heat. An increase in the iron oxide content of the slag also increases its fluidity and lowers its melting point. Consequently, a carbon deficiency in the charge produces a slag requiring less heat energy to form and to melt it, and the resulting excess of heat supplied by the arcs operating at substantially uniform power input is therefore available to smelt more of the charge bridge. Conversely, a progressive rise in the bridge level is indicative of an excess of carbon in the charge. Inasmuch as the bridge level is therefore an up-to-the-minute indicator of smelting conditions in the active smelting zone of the furnace, the measurement of this level is an accurate guide to the necessary corrective measure to be taken in the composition of the next charge mixture to be delivered into this portion of the furnace. The sensitivity of this indicator of smelting conditions is demonstrated by the fact that a bridge level about 8 feet below the furnace arch can be readily maintained within a variation of about 5 inches by control of the charge composition and amount.

The following specific example is illustrative of the practice of our invention:

A three-phase electric furnace having a plan section, electrode arrangement and charge opening distribution substantially identical with that shown in the drawing was operated at a power level of 18,000 kw. The ore delivered to the furnace had the following composition:

|  | Percent |
|---|---|
| $TiO_2$ | 37.3 |
| FeO | 26.3 |
| $Fe_2O_3$ | 30.0 |
| Total Fe | 41.4 |
| Balance | gangue |

This ore was charged to the furnace at the rate of 308 long tons per 24-hour period in intimate admixture with anthracite coal in the proportion of 15 pounds of coal per 100 pounds of ore. The ore/coal mixture was distributed through the charge ports in such manner that over a representative 24-hour period 98% of the charge was delivered between and laterally adjacent the six electrodes, one-half of this amount being delivered in aliquot portions through the ports 1a to 6a, inclusive, and the other half of this amount being delivered in aliquot portions through the ports 1b to 6b and 1c to 6c, inclusive. The remaining 2% of the charge was delivered through the ports 9 in order to maintain the desired sloping side wall banks of charge. Sustained furnace operation under these conditions produced a slag product tapped at a temperature of 1595° to 1615° C. and containing 70.3 to 71.5% titanium oxides calculated as $TiO_2$ and 12.1 to 13.0% ferrus oxide calculated as Fe. At the same time there was produced a molten iron product tapped at a temperature 1610° to 1620° C. and containing 1.77 to 1.81% carbon and 0.16% sulfur. These products were obtained while maintaining the aforementioned sloping side banks of charge terminating short of the electrodes and transverse bridges of charge extending between terminal portions of the side banks and across the spaces between each of the electrodes. These bridges supported the side banks and prevented their collapse with the result that there was no significant foaming of the slag or undue attack on or deterioration of the furnace roof. The constancy of the bridge formation was such that it was maintained at a level that did not vary more than about 5 inches, thus clearly indicating an exceptionally high degree of control of the active smelting condition made possible by frequent determination of the bridge level and concomitant charge variation such as to maintain a substantially constant bridge level within the aforementioned limit.

We claim:

1. The method of charging a mixture of titaniferous ore and solid carbonaceous material to a three-phase electric arc furnace which comprises first delivering the charge to the furnace in such manner as to establish a sloping bank of charge adjacent each side wall of the furnace with the lower extremity of the sloping banks terminating outboard of the electrodes, and thereafter maintaining the smelting aspect of the charge during continuous smelting by delivering up to 20% of the charge to the peripheral portion of the furnace so as to maintain said sloping side wall banks and by delivering the remainder of the charge to the central portion of the furnace in the vicinity of the electrodes, the central charge being distributed so that about 50% to 80% thereof is introduced in aliquot portions into the spaces between adjacent electrodes of different phase connection and the balance thereof is introduced in aliquot portions laterally of each of the electrodes, whereby the lower extremities of the sloping side wall banks are supported by bridges of the charge extending therebetween across the portions of the active smelting zone between adjacent electrodes of different phase connection with resulting improvement in smoothness of smelting and shielding of the furnace roof from radiation from the heating arcs.

2. The method of charging a mixture of titaniferous ore and solid carbonaceous material to a three-phase electric arc furnace which comprises first delivering the charge to the furnace in such manner as to establish a sloping bank of charge adjacent each side wall of the furnace with the lower extremity of the sloping banks terminating outboard of the electrodes, and thereafter maintaining the smelting aspect of the charge during continuous smelting by delivering up to 20% of the charge to the peripheral portion of the furnace so as to maintain said sloping side wall banks and by delivering the remainder of the charge to the central portion of the furnace in the vicinity of the electrodes, the central charge being distributed so that about 50% to 80% thereof is introduced in aliquot portions into the space between each of the adjacent electrodes of different phase connection and the balance thereof is introduced in aliquot portions laterally of each of the electrodes, the points of introduction of the charge between and laterally of the electrodes being substantially equidistant from the surfaces of the electrodes, whereby the lower extremities of the sloping side wall banks are supported by bridges of the charge extending therebetween across the portions of the active smelting zone between adjacent electrodes of different phase connection with resulting improvement in smoothness of smelting and shielding of the furnace roof from radiation from the heating arcs.

3. The method of charging a mixture of titaniferous ore and solid carbonaceous material to a three-phase electric arc furnace which comprises first delivering the charge to the furnace in such manner as to establish a sloping bank of charge adjacent each side wall of the furnace with the lower extremity of the sloping banks terminating outboard of the electrodes, and thereafter maintaining the smelting aspect of the charge during continuous smelting by delivering up to 20% of the charge to the peripheral portion of the furnace so as to maintain said sloping side wall banks and by delivering the remainder of the charge to the central portion of the furnace in the vicinity of the electrodes so as to maintain a plurality of solid bridges of charge therebetween, the central charge being distributed so that about 50% to 80% thereof is introduced in aliquot portions into the space between each of the adjacent electrodes of different phase connection and the balance thereof is introduced in aliquot portions laterally of each of the electrodes, whereby the lower extremities of the sloping side wall banks are supported by bridges of the charge extending therebetween across the portions of the active smelting zone between adjacent electrodes of different phase connection with resulting improvement in smoothness of smelting and shielding of the furnace roof from radiation from the heating arcs.

4. The method of charging a mixture of titaniferous ore and solid carbonaceous material to a three-phase electric arc furnace provided with six electrodes successive pairs of which are connected to separate phases which comprises first delivering the charge to the furnace in such manner as to establish a sloping bank of charge adjacent each side wall of the furnace with the lower extremity of the sloping banks terminating outboard of the electrodes, and thereafter maintaining the smelting aspect of the charge during continuous smelting by delivering up to 20% of the charge to the peripheral portion of the furnace so as to maintain said sloping side wall banks and by delivering the remainder of the charge to the central portion of the furnace in the vicinity of the electrodes, the central charge being distributed so that about 50% to 80% thereof is introduced in aliquot portions into the space between each pair of electrodes of different phase connection and the balance thereof is introduced in aliquot portions laterally of each of the electrodes, whereby the lower extremities of the sloping side wall banks are supported by bridges of the charge extending therebetween across the portions of the active smelting zone between adjacent electrodes of different phase connection with resulting improvement in smoothness of smelting and shielding of the furnace roof from radiation from the heating arcs.

References Cited in the file of this patent

UNITED STATES PATENTS 1,516,651     Tharaldsen _____ Nov. 25, 1924